(12) United States Patent
Fukushima et al.

(10) Patent No.: US 7,857,372 B2
(45) Date of Patent: Dec. 28, 2010

(54) TONNEAU COVER APPARATUS FOR AN AUTOMOBILE

(75) Inventors: Yoshio Fukushima, Hiroshima-ken (JP); Shingo Kunihiro, Hiroshima-ken (JP); Masatoshi Takayama, Hiroshima-ken (JP); Yoji Yatsushiro, Hiroshima-ken (JP); Kenji Nonaka, Hiroshima-ken (JP)

(73) Assignee: Madza Motor Corporation, Hiroshima-Ken (JP)

( * ) Notice: Subject to any disclaimer, the term of this patent is extended or adjusted under 35 U.S.C. 154(b) by 0 days.

(21) Appl. No.: 12/379,781

(22) Filed: Feb. 27, 2009

(65) Prior Publication Data
US 2009/0243321 A1    Oct. 1, 2009

(30) Foreign Application Priority Data
Mar. 31, 2008    (JP)    ............... 2008-090915

(51) Int. Cl.
*B60R 11/00* (2006.01)
(52) U.S. Cl. .................................. 296/37.16
(58) Field of Classification Search ............. 296/37.16, 296/24.43, 98; 160/370.22
See application file for complete search history.

(56) References Cited

U.S. PATENT DOCUMENTS

| | | |
|---|---|---|
| 6,402,217 B1 | 6/2002 | Ament et al. |
| 7,316,440 B2 * | 1/2008 | Walter et al. .............. 296/37.16 |
| 7,537,265 B2 * | 5/2009 | Hori et al. ............... 296/100.15 |
| 2005/0012352 A1 * | 1/2005 | Sparrer et al. ............ 296/24.43 |

FOREIGN PATENT DOCUMENTS

| | | |
|---|---|---|
| DE | 196 50 775 A1 | 6/1998 |
| DE | 20 2007 008 181 U1 | 10/2007 |
| JP | 59-104849 | 7/1984 |
| JP | 3613581 | 11/2004 |
| JP | 2006-298143 | 11/2006 |
| JP | 2008-49768 | 3/2008 |
| WO | 98/24657 | 6/1998 |

OTHER PUBLICATIONS

Eurpean Search Report dated Aug. 10, 2009 and issued in corresponding European Patent Application 09152239.1.

* cited by examiner

*Primary Examiner*—Joseph D Pape
(74) *Attorney, Agent, or Firm*—Staas & Halsey LLP

(57) ABSTRACT

A tonneau cover apparatus for an automobile including a baggage compartment, a baggage compartment opening, and a gate which covers the baggage compartment opening to be openable is provided. The tonneau cover apparatus includes a cover member extending from a position spaced apart from the baggage compartment opening toward the baggage compartment opening to cover the baggage compartment, and a guide portion which is formed at a portion of the baggage compartment opening to be covered by the gate and guides vertical movement of the cover distal end of the cover member.

11 Claims, 13 Drawing Sheets

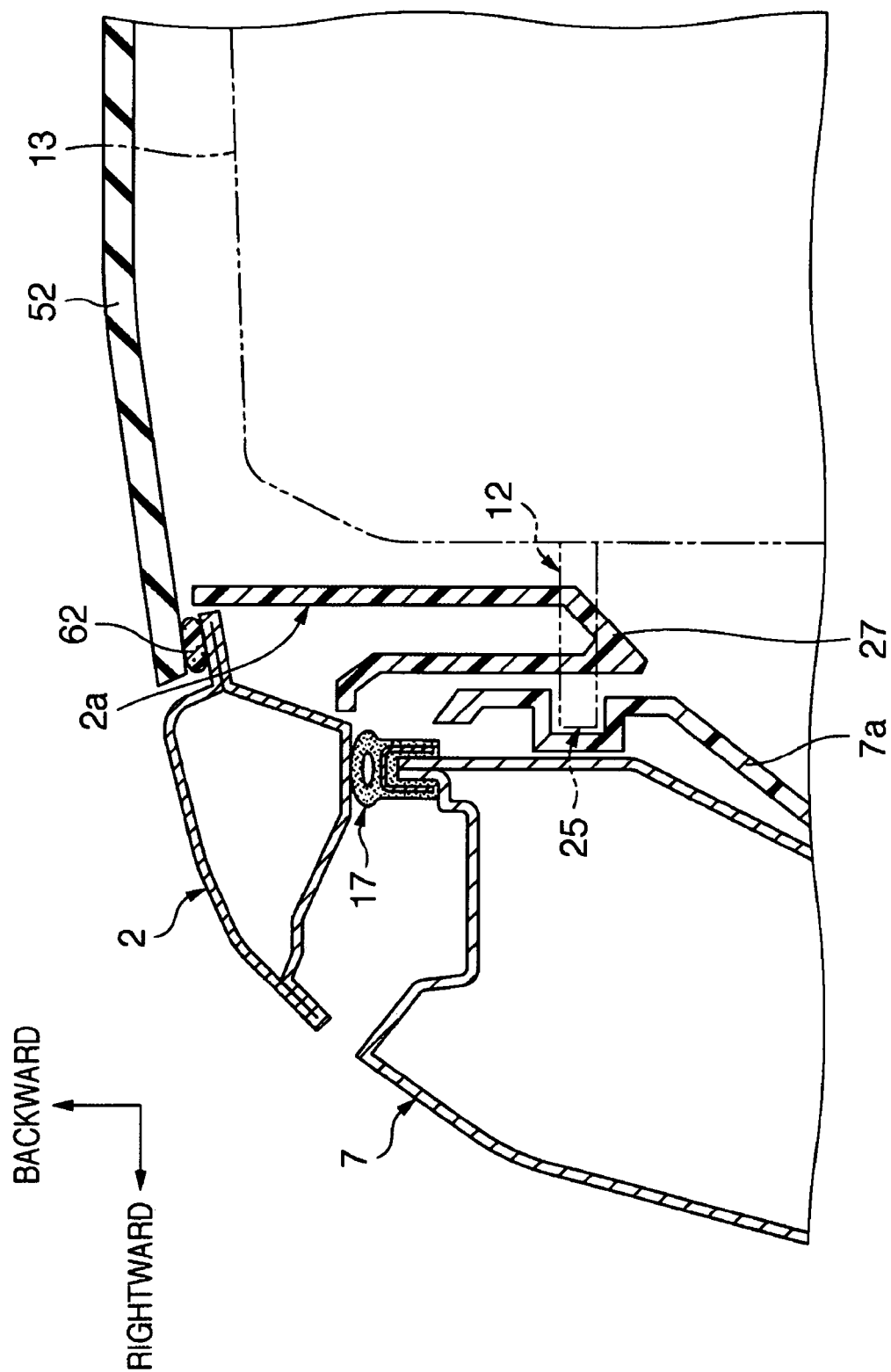

TONNEAU COVER APPARATUS FOR AN AUTOMOBILE

BACKGROUND OF THE INVENTION

1. Field of the Invention

The present invention relates to a tonneau cover apparatus for an automobile.

2. Description of the Related Art

Many automobiles such as station wagons have a tonneau cover apparatus which covers a baggage compartment.

Specifically, a tonneau cover apparatus for a passenger car must satisfy, for example, the following requirements.

(1) As the tonneau cover is not always necessary, it must be able to be stored compact when not in use.

(2) The tonneau cover must be able to be handled easily when it is stored or used.

(3) The tonneau cover must not degrade the automobile design.

(4) The tonneau cover apparatus itself must also be detached/attached easily.

Currently, a tonneau cover apparatus is widely known which includes a take-up device for automatically taking up a cover sheet when it is not in use and from which the cover sheet can be pulled out when it is to be used. This can satisfy the requirement of item (1).

In a state in which the tonneau cover covers the baggage compartment, if the user wishes to open the tail gate and access baggage in the baggage compartment through a baggage compartment opening, he needs to perform operation of disengaging the cover distal end and storing the tonneau cover in the take-up device. This operation is sometimes cumbersome. In addition, after accessing the baggage, if the user wishes to cover the baggage compartment with the tonneau cover again, he must incline forward, sometimes enter the baggage compartment, reach the take-up device at the front portion of the baggage compartment, and pull out the cover distal end. This doubles the cumbersomeness. That is to say, the operability of item (2) has room for improvement.

Japanese Patent No. 3,613,581 (to be referred to as "patent reference 1" hereinafter) discloses an arrangement that solves the above problem directly. More specifically, FIG. 1 of patent reference 1 discloses a mechanism including a lever 28. The lever 28 has one end supported by a side wall 4 through a hinge 29 and the other end which receives a pin 26 at a cover distal end. A blind sheet 17 is raised/lowered by turning the lever 28. FIGS. 2 to 4 disclose a mechanism in which a guide rail 35 is formed at a side edge 12 of a rear opening 7. When a tail gate 8 is opened/closed, the distal end of the blind sheet 17 moves along the guide rail 35. FIG. 5 discloses an arrangement in which a groove 43 is formed in the side edge 12 of a rear opening 7. The distal end of the blind sheet 17 slides along the groove 43. According to these arrangements, the user can access a baggage compartment 2 without restoring the blind sheet 17 in a housing 16, and can easily cover the baggage compartment 2 with the blind sheet 17 after accessing the baggage compartment 2.

Japanese Utility Model Laid-Open No. 59-104849 (to be referred to as "patent reference 2" hereinafter) discloses an example including at least two cover sheets that can be taken up simultaneously by a take-up device. The distal ends of the cover sheets are locked at various positions including the ceiling. This disclosure suggests an arrangement in which the user can access baggage in the baggage compartment without taking up a tonneau cover entirely by the take-up device.

However, neither one of the arrangements disclosed in patent references 1 and 2 considers the design referred to in the above item (3). The presence of the lever 28, guide rail 35, groove 43, and the like in patent reference 1 may undesirably degrade the interior design of the baggage compartment. In patent reference 2, although the distal ends of the cover sheets can be locked at various positions, a rail that is not necessarily used often is always seen when the rear gate is closed. This degrades the appearance.

In patent references 1 and 2, the guide portion of the cover sheet distal end is arranged in the automobile. Hence, the shape and design of the passenger compartment such as the ceiling position and the inclination of the inner wall limit the range of the guide portion. This makes it difficult to form a sufficiently high guide portion. The guide portion can be formed of a trim. In this case, however, the appearance of the trim is degraded, and function structures and the like such as a shock absorbing rim are difficult to design. When the guide portion is formed as a separate member, the number of components increases, the location to set the guide portion is difficult to ensure, and the appearance is degraded. The guide portion must be formed by considering these factors.

A conventional tonneau cover apparatus cannot be attached or detached easily. For example, when removing the tonneau cover apparatus, the user releases it and after that pulls it out almost horizontally toward the baggage compartment opening. As the tonneau cover apparatus is generally as wide as possible in the direction of the automobile width, the end of the apparatus tends to abut against the baggage compartment side wall and the like. To avoid this, the user must pull out the tonneau cover apparatus obliquely. This operation is thus not easy.

According to patent reference 1, the mechanism which guides the vertical movement of the cover sheet distal end is formed on the automobile inner surface. Hence, the horizontal movement of the tonneau cover apparatus is regulated at the baggage compartment opening. This makes it further cumbersome to attach or detach the tonneau cover apparatus to or from the baggage compartment.

SUMMARY OF THE INVENTION

The present invention has as its object to improve a tonneau cover apparatus and solve at least any one of the problems described above. For example, it is an object of the present invention to provide a tonneau cover apparatus with operability which is improved without impairing the design.

According to one aspect of the present invention, a tonneau cover apparatus for an automobile including a baggage compartment, a baggage compartment opening, and a gate which covers the baggage compartment opening to be openable is provided. The tonneau cover apparatus includes a cover member extending from a position spaced apart from the baggage compartment opening toward the baggage compartment opening to cover the baggage compartment, and a guide portion which is formed at a portion of the baggage compartment opening to be covered by the gate and guides vertical movement of the cover distal end of the cover member.

Further features of the present invention will become apparent from the following description of an exemplary embodiment with reference to the attached drawings.

BRIEF DESCRIPTION OF THE DRAWINGS

FIG. 13 is a sectional view taken along the line C-C of FIG. 11.

DESCRIPTION OF THE EMBODIMENT

An exemplary embodiment, features, and aspects of the present invention will be described in detail below with reference to the drawings. The present invention is not limited by the disclosure of the embodiment and all combinations of the features described in the embodiment are not always indispensable to solving means of the present invention.

Figure 1:
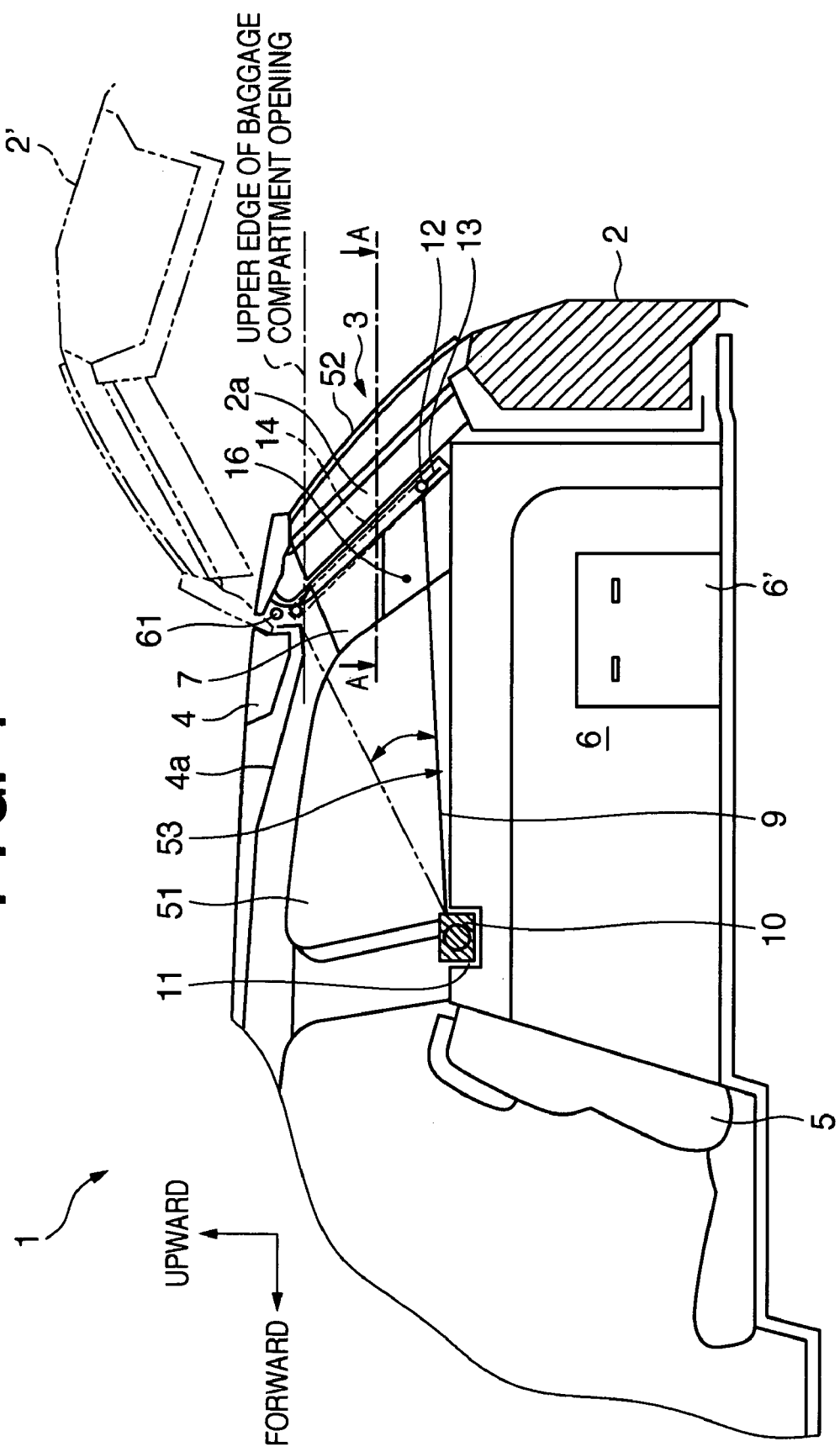
FIG. 1 is a perspective side view of the rear portion of an automobile according to an embodiment.
Figure 2:
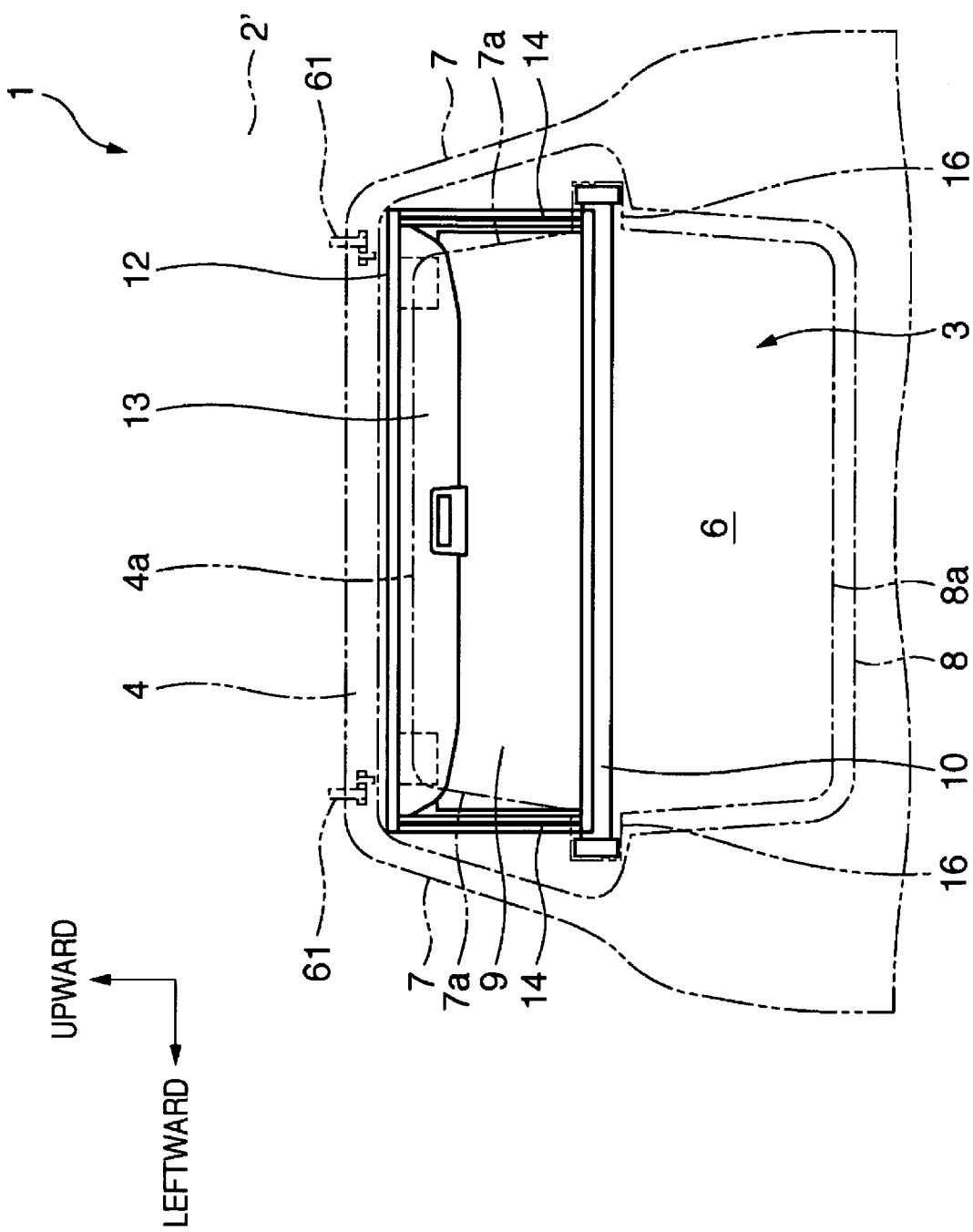
FIG. 2 is a rear view of the automobile according to the embodiment.
Figure 3:
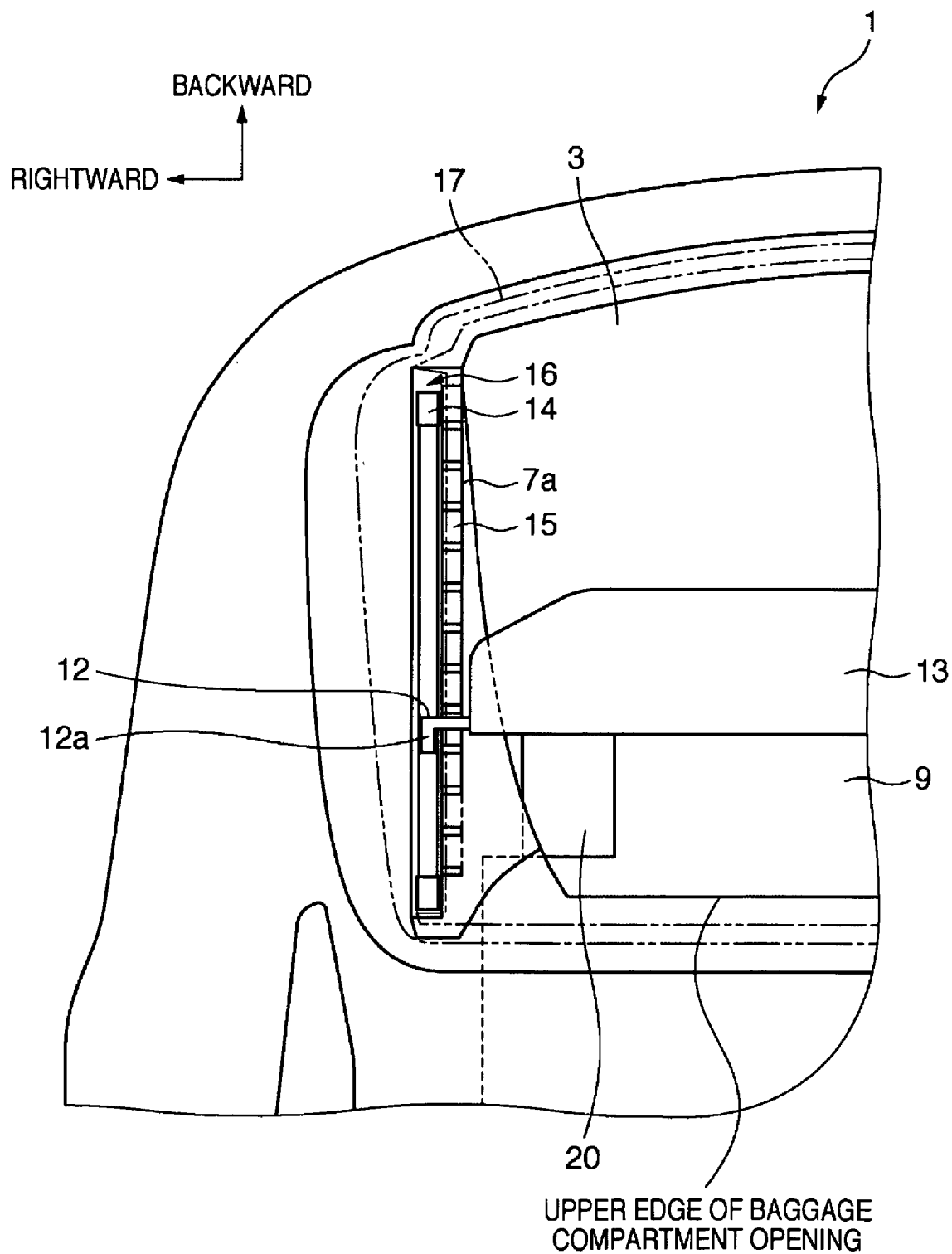
FIG. 3 is a plan view of the main part of the automobile rear portion according to the embodiment.
Figure 4:
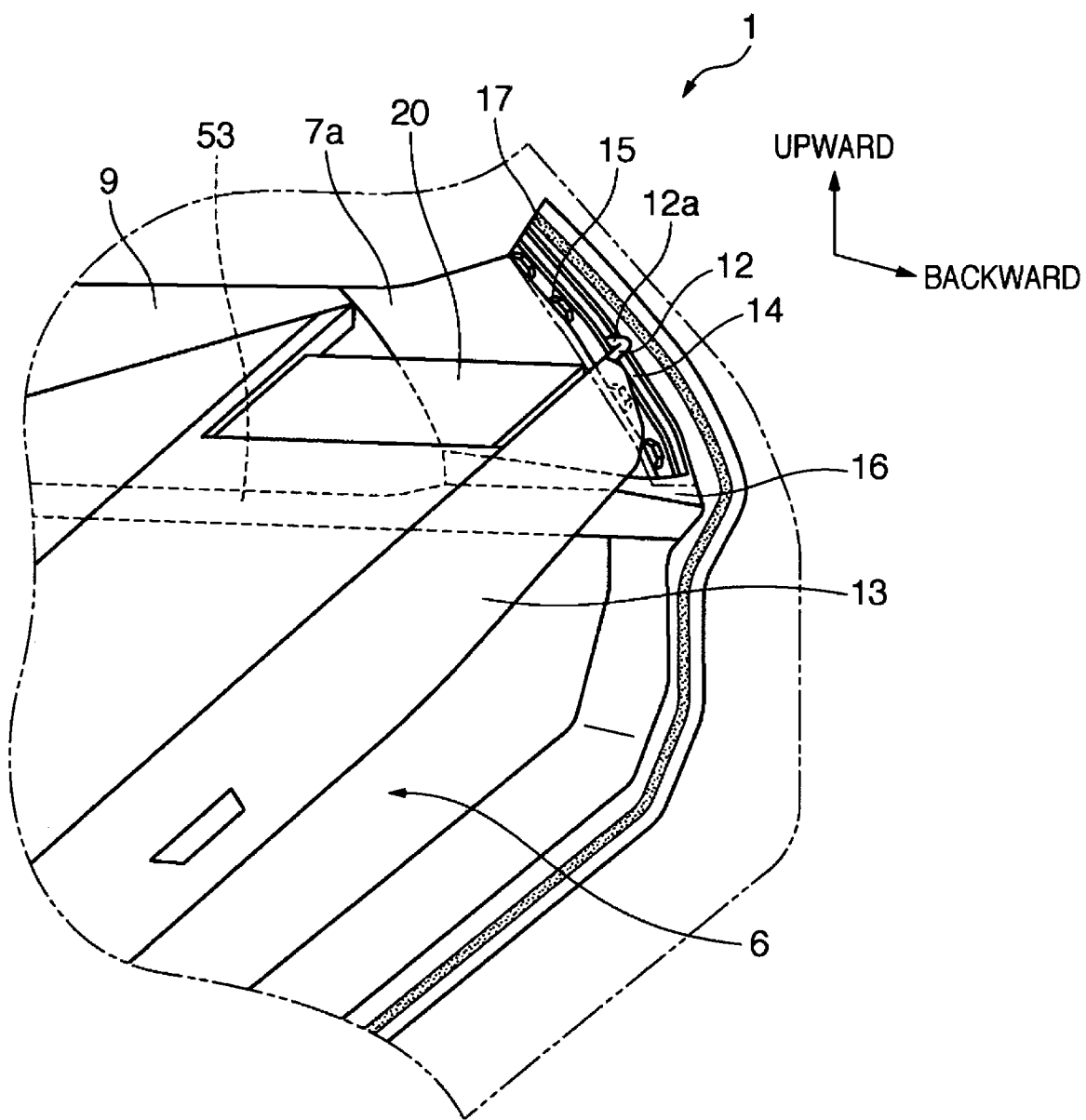
FIG. 4 is a perspective view of the main part of the automobile rear portion according to the embodiment when a rear gate is open.
Figure 5:
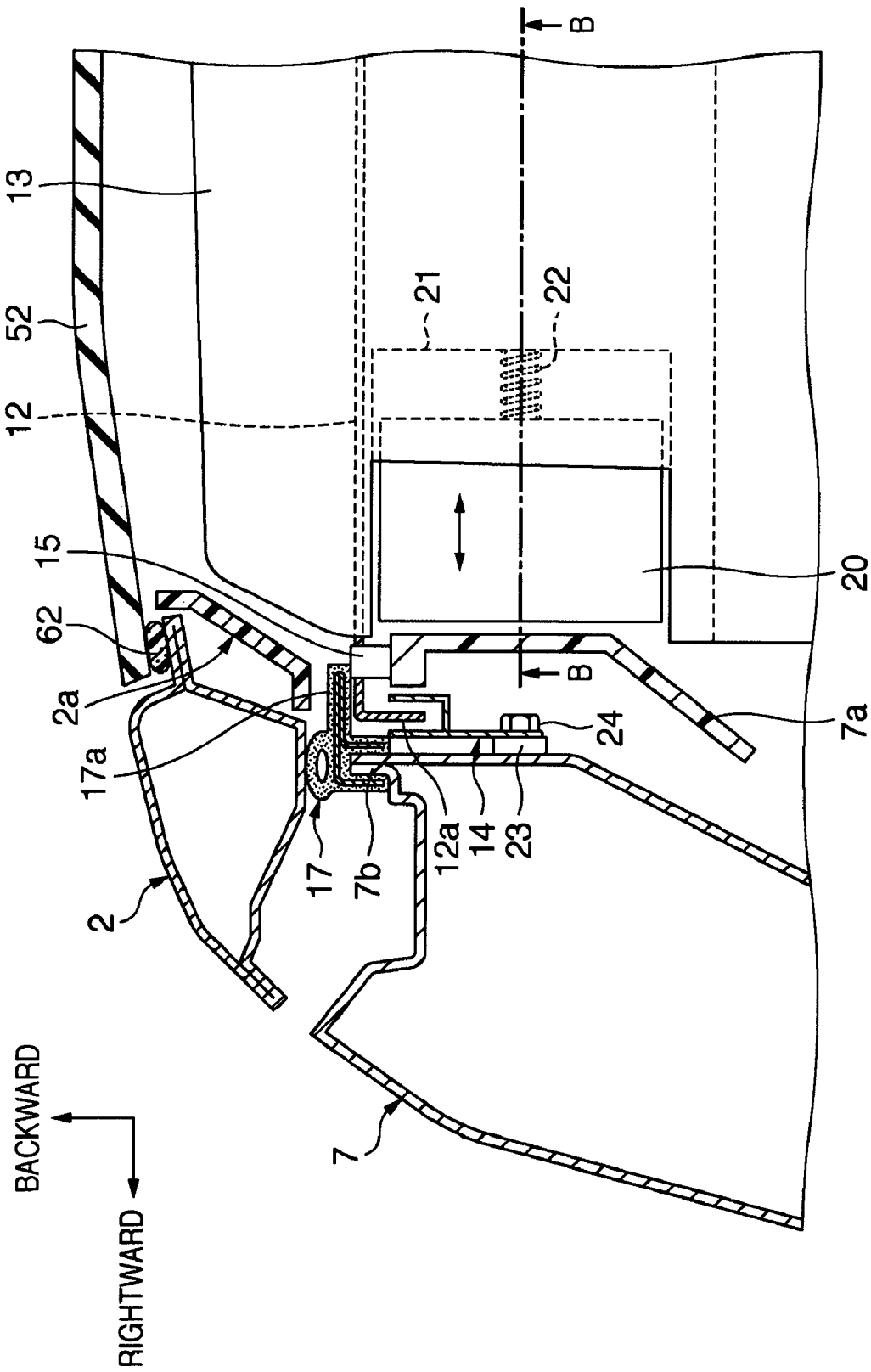
FIG. 5 is a sectional view taken along the line A-A of FIG. 1.

FIG. 1 is a perspective side view of the rear portion of an automobile 1 according to an embodiment, FIG. 2 is a rear view of the automobile 1, FIG. 3 is a plan view of the main part of the rear portion of the automobile 1, FIG. 4 is a perspective view of the main part of the rear portion of the automobile 1, and FIG. 5 is a sectional view taken along the line A-A of FIG. 1.

The automobile body rear portion of the automobile 1 has a baggage compartment opening 3 opened/closed with a rear gate 2. The rear end of a roof is provided with a rear header 4 which reinforces the rear end of a roof panel throughout the entire width. One end of the rear gate 2 is connected to the rear header 4 through hinges 61. The rear gate 2 can open/close between a closing position for covering the baggage compartment opening 3 and an open position 2' about the hinges 61 as a fulcrum.

A baggage compartment 6 at the automobile body rear portion which is partitioned by the rear surface of the backrest of a rear sheet 5 and the inner surface of the rear gate 2 is formed inside the baggage compartment opening 3. When the rear gate 2 is open, the user can access from outside a baggage 6' or the like placed in the baggage compartment 6. The baggage compartment opening 3 has an almost square shape formed of the rear header 4, a pair of left and right rear pillars 7, and a rear end cross member 8. The pair of left and right rear openings 7 support the rear header 4. The two ends of the rear end cross member 8 in the direction of the automobile width are connected to the lower ends of the rear pillars 7, respectively. Note that a roof trim 4a, rear pillar trims 7a, and rear end trim 8a are arranged inside the rear header 4, rear pillars 7, and rear end cross member 8, respectively, and define the baggage compartment opening 3 in practice.

A tonneau cover 9 serving as a cover member can cover the baggage compartment 6 not to be peeked in from outside the automobile through rear quarter windows 51 or rear window 52. A take-up portion 10 is a device to take up the tonneau cover 9. The take-up portion 10 is disengageably locked at a position spaced apart from the baggage compartment opening 3, for example, in a recess 11 serving as a cover locking portion and formed behind the rear sheet 5 (e.g., in the rear pillars 7 on the inner side of the automobile). With the take-up portion 10, the tonneau cover 9 can be opened/closed within a range easily reached by the user, taken up in a compact size, and attached/detached easily. As the take-up portion 10, a known one can be used, and accordingly its detailed arrangement will not be described. Note that the take-up portion 10 biases the tonneau cover 9 in a take-up direction by spring driving or the like.

A cover distal end 13 as the distal end of the tonneau cover 9 forms a handhold. A rod 12 extending in the direction of the automobile width is attached to the cover distal end 13. The rod 12 is longer than the width of the tonneau cover 9, and its two ends are exposed from the tonneau cover 9 to the left and right.

As shown in FIGS. 3 to 5, each of the two ends of the rod 12 exposed from the tonneau cover 9 to the left and right has an L-shaped end 12a which is bent forward along the vehicle to form an L shape. Those portions of the baggage compartment opening 3 which are covered by the rear gate 2 are provided with a pair of left and right guide rails 14 serving as guide portions which guide the vertical movement of the cover distal end 13. As shown in, for example, FIG. 5, each guide rail 14 is fixed to the surface of the rear pillar 7 on the automobile inner side through a collar 23 by fastening with a bolt 24. The rear pillar 7 serves as a automobile body constituent member. The guide rail 14 has a groove extending from a position at almost the same height as that of the take-up portion 10 to near the upper end of the rear pillar 7. The groove is formed in the outer surface of the automobile, for example, in the rear side of the vehicle, and has such a diameter that at least the L-shaped end 12a of the rod 12 is fitted in it. The rear pillar trim 7a covers the guide rail 14 on the inner side of the automobile. In this manner, the guide rail 14 is disposed between the rear pillar trim 7a which covers the baggage compartment opening 3 on the inner side of the automobile and the rear pillar 7 which forms the baggage compartment opening 3. In this case, the rear pillar 7 can be molded easily, so it can exhibit another function such as that of a shock absorbing rib easily.

Furthermore, as shown in FIG. 4, a guide groove 16 extending almost horizontally is formed in the surface of the rear pillar trim 7a on the inner side of the automobile. The front end of the guide groove 16 is open, and its lower wall is smoothly connected to the trim upper surface that forms the lower edge of the window frame of the rear quarter window 51. This trim upper surface forms a guide surface 53 shown in FIG. 1. The rear end of the guide groove 16 extends to the baggage compartment opening 3 and is open. In this manner, the guide surface 53 and guide groove 16 constitute the second guide portion which guides the tonneau cover 9 from the position where the take-up portion 10 is disposed to under the guide rail 14 almost horizontally.

The lower end of the guide rail 14 is open and communicates with the rear end of the guide groove 16.

When the user wishes to use the tonneau cover 9, he can hold the cover distal end 13, pull out the tonneau cover 9 stored in the take-up portion 10 from the take-up portion 10 against the take-up biasing force of the take-up portion 10, and lock the L-shaped ends 12a of the rod 12 by fitting them at an arbitrary height in the grooves of the guide rails 14. When pulling out the tonneau cover 9 from the take-up portion 10, the user can pull out the cover distal end 13 along the guide surface 53 and guide grooves 16. This operation can be performed very smoothly.

The take-up portion 10 always biases the tonneau cover 9 in the take-up direction. Even if the cover distal end 13 is set at an arbitrary height of the guide rails 14, the tonneau cover 9 covering the baggage compartment 6 is kept stretched.

According to this embodiment, the direction to pull out and take up the tonneau cover 9 is the same as the direction to engage and disengage the cover distal end 13 with and from the guide rails 14. This further facilitates the operation of mounting and detaching the take-up portion 10. The cover distal end 13 is formed such that it can be pulled out behind the guide rails 14. Accordingly, the user can pull out the cover distal end 13 slightly behind the guide rails 14, vertically moves it quickly without engaging it with the guide rails 14, and after that readily lock it at desired positions of the guide rails 14.

Figure 6:
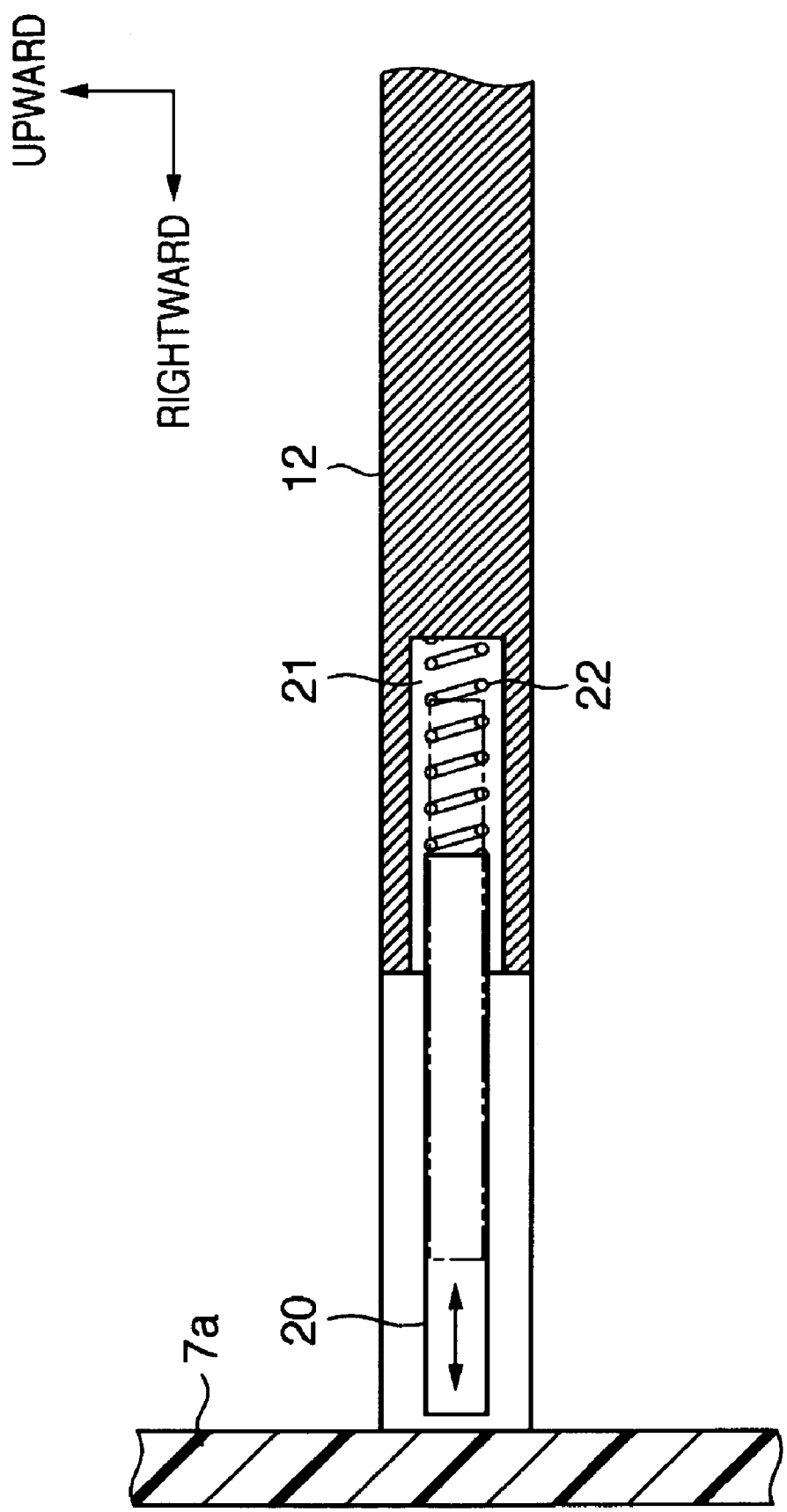
FIG. 6 is a sectional view taken along the line B-B of FIG. 5.

Generally, the rear pillars and rear pillar trims are inclined toward the inner side of the automobile due to the vehicle design. Namely, the inner width of the automobile compartment usually decreases upward. Hence, according to this embodiment, as shown in FIG. 4, the tonneau cover 9 is provided with a slide portion 20 at a position corresponding to the rear pillar trim 7a which is on the front side of the position of the rod 12 in the vehicle. The slide portion 20 slides to the left and right in accordance with a change in gap between the left and right rear pillar trims 7a upon the vertical movement of the cover distal end 13 along the guide rails 14. For example, as shown in FIG. 5 and FIG. 6 which is a sectional view taken along the line B-B of FIG. 5, a storing portion 21 which stores the slide portion 20 is formed. A compression spring 22 is fixed to the side wall of the storing portion 21 on the inner side of the automobile. The compression spring 22 biases the slide portion 20 outside the automobile. When the cover distal end 13 is moved upward along the guide rails 14, the slide portion 20 is pushed inside the automobile by the rear pillar trim 7a against the biasing force of the slide portion 20. Hence, the slide portion 20 moves inward the automobile in accordance with a change in gap between the left and right rear pillar trims 7a.

When the user wishes to cover the baggage compartment 6 with the tonneau cover 9, he need only hold the cover distal end 13 and move it toward the lower ends of the guide rails 14. In this state, when the user closes the rear gate 2, the interior of the baggage compartment 6 becomes invisible from outside the automobile.

When the user wishes to open the rear gate 2 and access inside the baggage compartment 6, he need only move the cover distal end 13 to an upper arbitrary position along the guide rails 14 until a space sufficient to access is ensured. Namely, in this case, the take-up portion 10 need not take up the tonneau cover 9 entirely.

In this manner, the user can adjust the opening degree of the tonneau cover 9 within a range with which he can reach the cover distal end 13 near the baggage compartment opening 3 easily. In addition, when the rear gate 2 is closed, it hides the guide rails 14. This provides a good appearance. Furthermore, when the guide rails 14 are disposed on the outer surface of the automobile, as described above, even if the rear gate 2 is open, the guide rails 14 are invisible from the inner side of the automobile, thus providing a good appearance.

According to this embodiment, as shown in FIGS. 3 to 5, the guide rail 14 is further provided with a holding portion 15 which is adjacent to it on the inner side of the automobile. FIGS. 3 to 5 show an example in which the holding portions 15 are disposed on the surfaces of the rear pillar trims 7a on the outer side of the automobile. The holding portions 15 are formed to have a predetermined holding force in a direction along which the cover distal end 13 is vertically moved along the guide rails 14. This is aimed at holding the cover distal end 13 at predetermined positions of the guide rails 14. More specifically, each holding portion 15 includes a projection projecting backward outside the automobile. The lower surface of the projection receives a portion before the bent portion of the L-shaped end 12a of the rod 12. The holding portions 15 can prevent the cover distal end 13 from being shifted upward due to vibration or the like during driving.

According to this embodiment, the holding portion 15 has a plurality of projections lining up at predetermined intervals along the guide rail 14. When adjusting the opening degree of the tonneau cover 9, the user can lightly pull out the cover distal end 13 behind the guide rail 14 and move the cover distal end 13 to a desired projection over the projections before it. The holding portions 15 having the plurality of projections can hold the cover distal end 13 at the predetermined positions of the guide rails 14 with a good click feeling. Thus, the user can adjust the opening degree of the tonneau cover 9 easily. In addition, as the holding portions 15 are hidden when the rear gate 2 is closed, dirt and degradation of the appearance can be prevented regardless of the shapes of the holding portions 15.

The guide rail 14 according to this embodiment is disposed between the rear pillar 7 and the rear pillar trim 7a which covers the rear pillar 7 on the inner side of the automobile. Hence, when compared to an arrangement in which the guide rail 14 and holding portion 15 are formed on part of the surface of the rear pillar trim 7a on the inner side of the automobile, the rear pillar trim 7a has a higher degree of design freedom, and a high-function structure such as a shock absorbing rib can be provided easily.

The baggage compartment opening 3 is provided with a known weather strip 17 to prevent dust and water from entering through the gap between the rear gate 2 and baggage compartment opening 3 when the rear gate 2 is closed. FIG. 5 as a sectional view taken along the line A-A of FIG. 1, and FIG. 7 as a perspective view of the main part of the rear portion of the automobile 1 when the rear gate 2 is open show a practical example of the weather strip 17. Referring to FIG. 5, a flange 7b is formed at the rear end of the rear pillar 7 on the inner side of the automobile. The weather strip 17 formed of a hollow rubber member is mounted on the flange 7b. When the rear gate 2 is closed, the weather strip 17 seals the gap between the rear gate 2 and baggage compartment opening 3.

Figure 7:
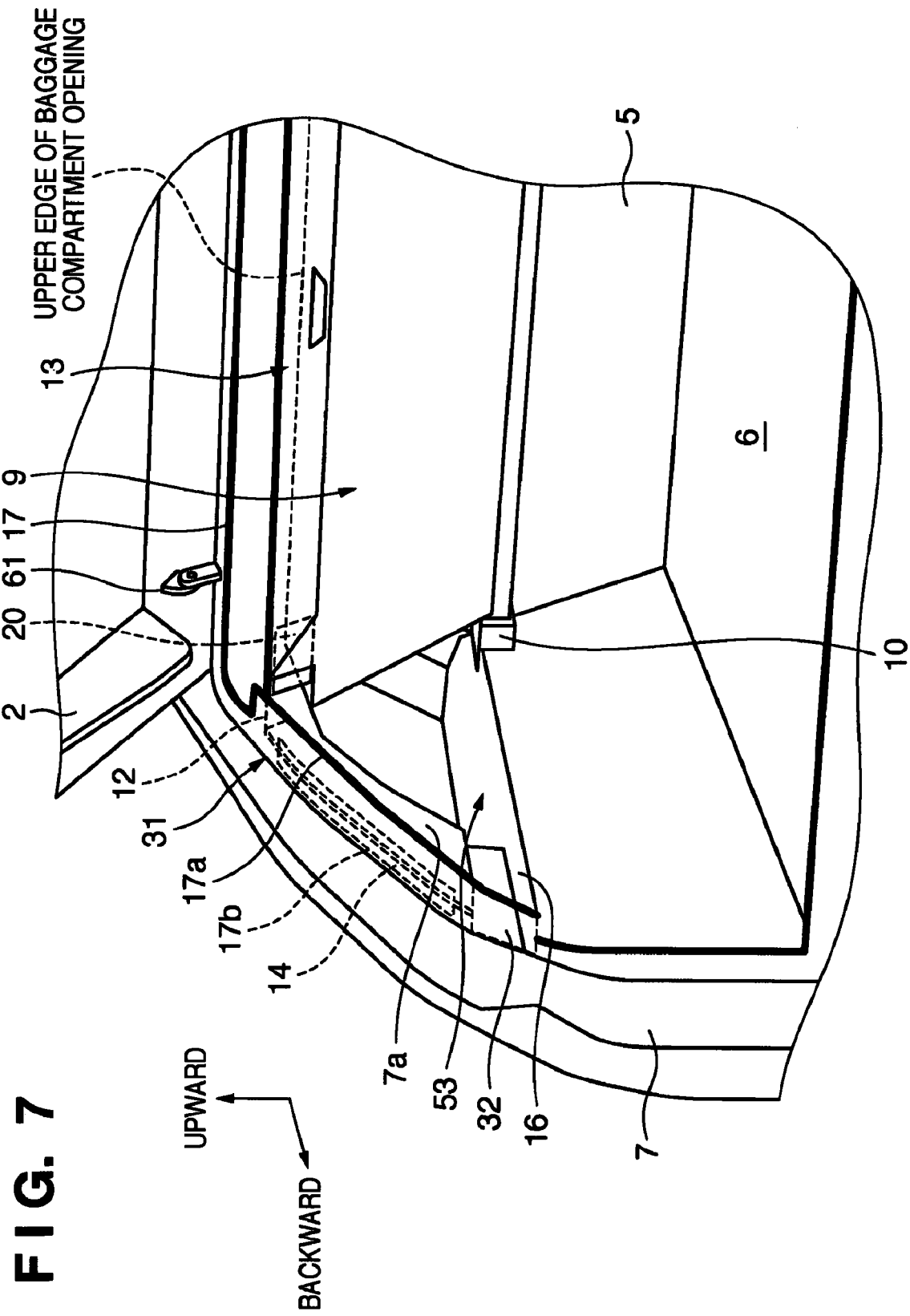
FIG. 7 is a perspective view of the main part of the automobile rear portion according to the embodiment when the rear gate is open.

According to this embodiment, the weather strip 17 has a lip 17a extending to a position on the inner side of the automobile corresponding to a rear gate trim 2a. The lip 17a covers the guide rails 14 from the rear side of the vehicle. Hence, as shown in FIG. 7, even when the rear gate 2 is open, the guide rails 14 are not exposed outside the automobile, making the baggage compartment opening 3 look nice. This can be achieved without increasing the number of components.

Thus, the vertical movement of the rod 12 of the cover distal end 13 is guided between the guide rails 14 and the lip 17a of the weather strip 17. More specifically, the guide rails 14 guide the rod 12 from the front side of the vehicle, and the lip 17a of the weather strip 17 guides the rod 12 while covering it from the rear side of the vehicle. In other words, in this case, the guide rails 14 and weather strip 17 constitute a guide portion that guides the vertical movement of the cover distal end 13.

The user can vertically move the rod 12, sandwiched by the guide rail 14 and lip 17a of the weather strip 17, of the cover distal end 13 along the guide rails 14. The lip 17a of the weather strip 17 is preferably elastic in the back-and-forth direction of the vehicle. Then, the user can pull out the cover distal end 13 from an arbitrary height against the elastic force of the lip 17a and remove it backward outside the automobile. Conversely, the user can insert the cover distal end 13 in the lip 17a and fit it in the guide rails 14 easily. As a member used to form such a lip 17a, a rubber member is suitable. In place of the rubber member, a harder material such as a plastic material may be employed and provided with an elastic force adding by a hinge mechanism.

Figure 8:
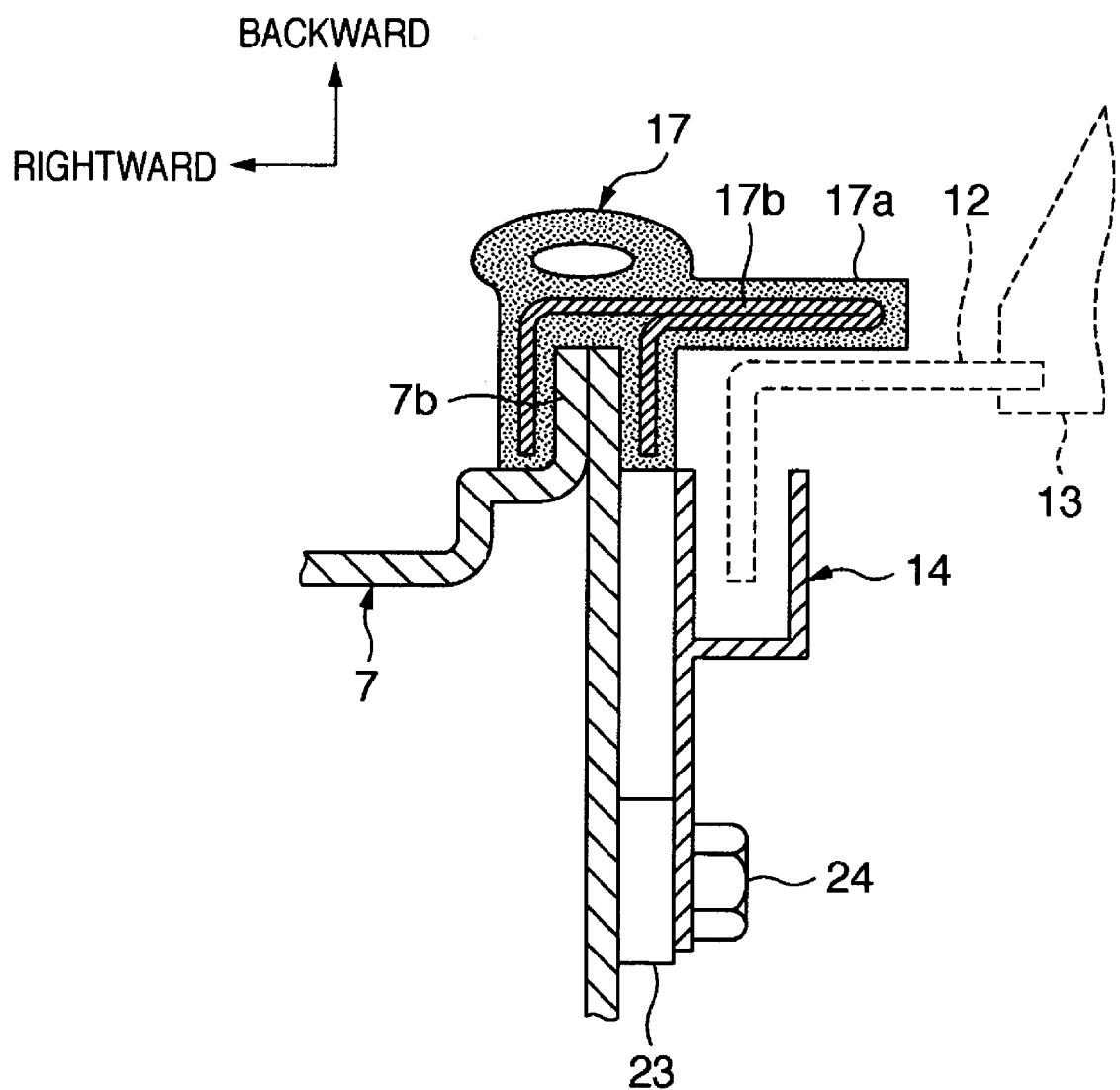
FIG. 8 is a view for explaining a weather strip having a core bar in the embodiment.

Alternatively, the weather strip 17 can have a core bar so the strength of the weather strip 17 itself and the guide strength are increased. FIG. 8 is an enlarged view of the main part of FIG. 5 in this case. As shown in FIG. 8, the weather strip 17 incorporates a core bar 17b. The core bar 17b extends into the lip 17a and covers the rod 12 in the cover distal end 13.

If the weather strip 17 has the core bar 17b in this manner, it may be difficult for the user to pull out the cover distal end 13 backward from an arbitrary height against the guide force of the core bar 17b in the lip 17a and remove it backward outside the automobile.

In view of this, as shown in FIG. 7, a predetermined portion of the weather strip 17, for example, a portion 31 corresponding to the upper end of the guide rail 14, and the lower end of the guide rail 14, that is, a portion 32 corresponding to the rear end open portion of the guide groove 16, preferably form pull-out portions having no core bar 17b. With this arrangement, the tonneau cover 9 can be pulled out from the pull-out portions readily.

The lip 17a of the weather strip 17 preferably forms a portion which abuts against the rod 12 of the cover distal end 13, and the cover distal end 13 preferably has such elasticity and frictional resistance that it can be held at an arbitrary position in the vertical direction. Then, the opening degree of the tonneau cover 9 can be adjusted freely without forming a guide portion with a complicated shape. For example, the holding portions 15 described above need not always be provided.

Furthermore, according to this embodiment, when the rear gate 2 is closed, a gap just enough for the rod 12 of the cover distal end 13 to pass through is formed between the guide rails 14 and rear gate trim 2a where the lip 17a is interposed. Hence, even when the rear gate 2 is closed, the cover distal end 13 will not be damaged.

If the guide groove 16 described above has such a size that the take-up portion 10 can enter it, it can be used not only as a pull-out guide for the tonneau cover 9 but also as a guide which serves when mounting and removing the tonneau cover 9 together with the take-up portion 10.

Figure 9:
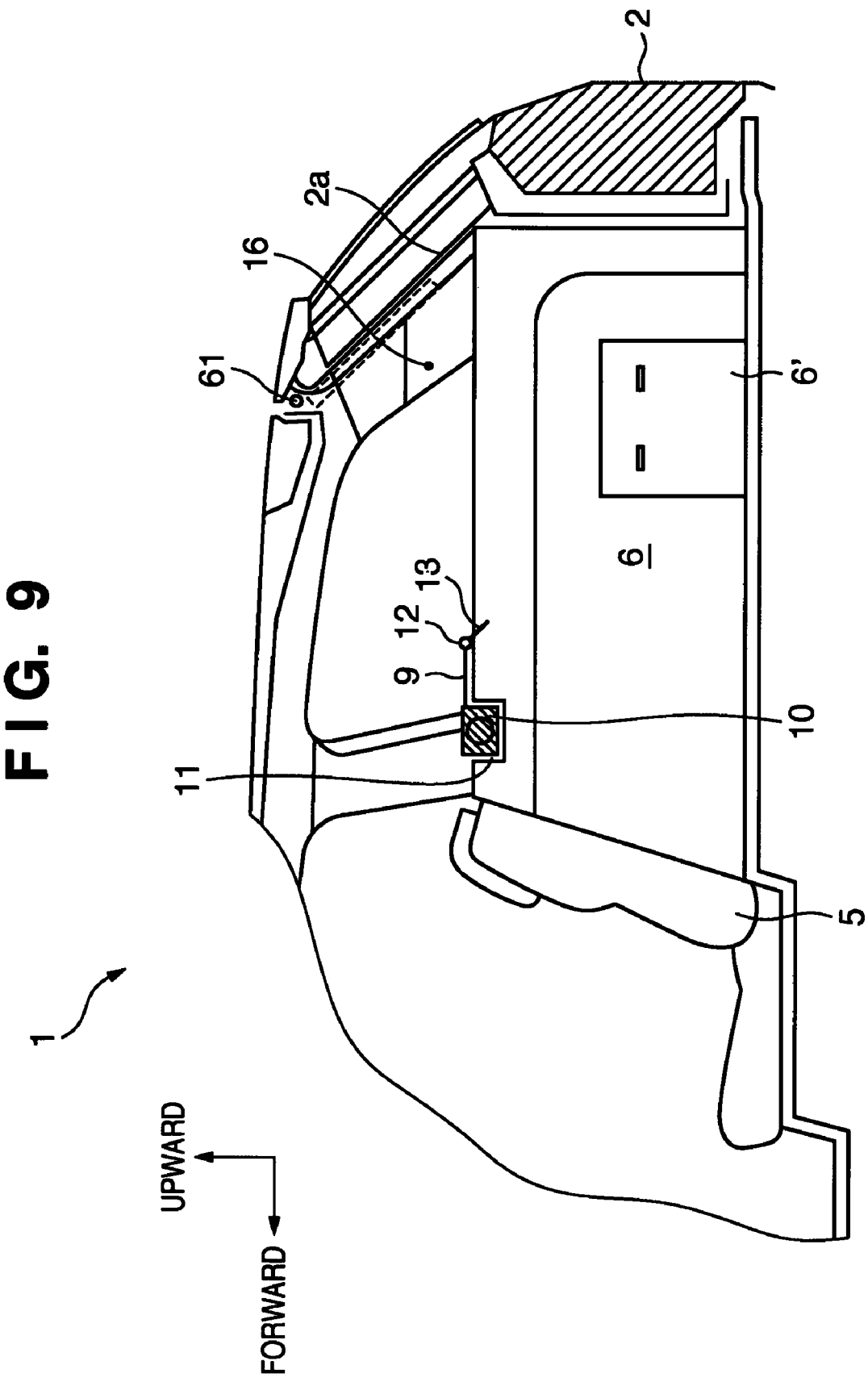
FIGS. 9 and 10 are views for explaining a process for removing a take-up portion in the embodiment.
Figure 10:
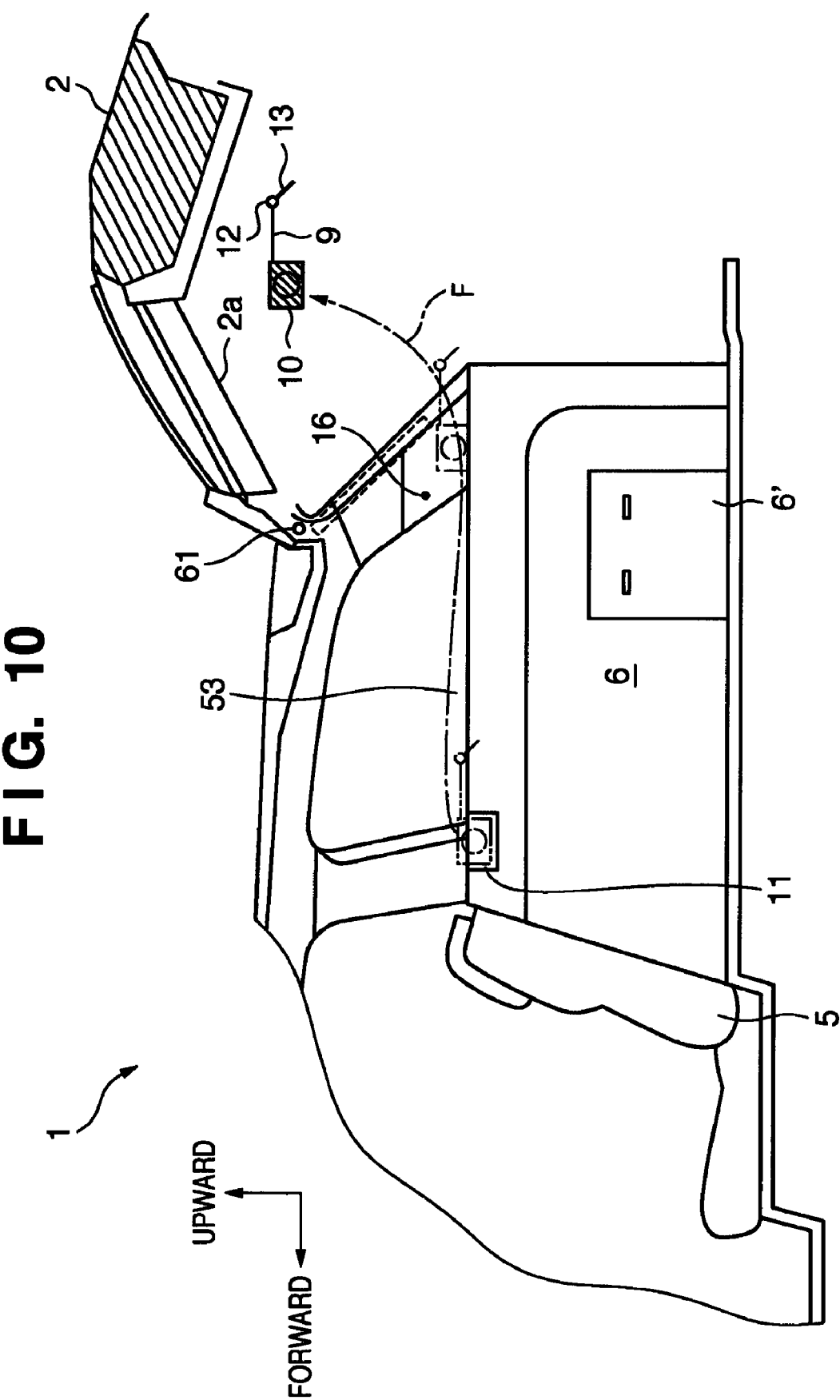

As an example, a case in which the take-up portion 10 is to be removed will be described with reference to FIGS. 9 and 10. FIG. 9 shows a state in which the take-up portion 10 has almost taken up the tonneau cover 9. In this state, the user opens the rear gate 2 as shown in FIG. 10, disengages the take-up portion 10 fixed in the recess 11, and removes the take-up portion 10 in the recess 11 from the baggage compartment opening 3. The user then moves the take-up portion 10 backward along the guide surface 53 and takes it outside the automobile through the guide groove 16, as indicated by an alternate long and short dashed line F.

The take-up portion is generally as wide as possible in the direction of the automobile width. Accordingly, when mounting and removing the take-up portion, its end conventionally tends to abut against the baggage compartment side wall or the like. This may damage or break the take-up portion. To avoid this, for example, the user must pull out the take-up portion obliquely, leading to difficult operation. In contrast to this, according to this embodiment, since the take-up portion 10 can be moved almost horizontally along the guide surface 53 and guide groove 16, the mounting/removing operation is very smooth.

According to this embodiment, the guide rails 14 are formed in the outer surface of the automobile, that is, in the rear side of the vehicle. Thus, when the rear gate 2 is closed, the guide rails 14 can be hidden easily. Also, advantageously, the guide rails 14 do not regulate the horizontal movement of the take-up portion 10 described above when mounting/removing it. More specifically, according to this embodiment, the cover distal end 13 can be vertically guided, and the take-up portion 10 can be mounted in and removed from the baggage compartment 6 easily. The guide rails 14 are formed not on the ceiling or inner wall, but on the outer surface of the automobile. Thus, the guide ranges of the guide rails 14 are not easily affected by the height of the ceiling or the inclination of the inner wall. Also, the guide ranges can be set with a higher upper limit.

Figure 11:
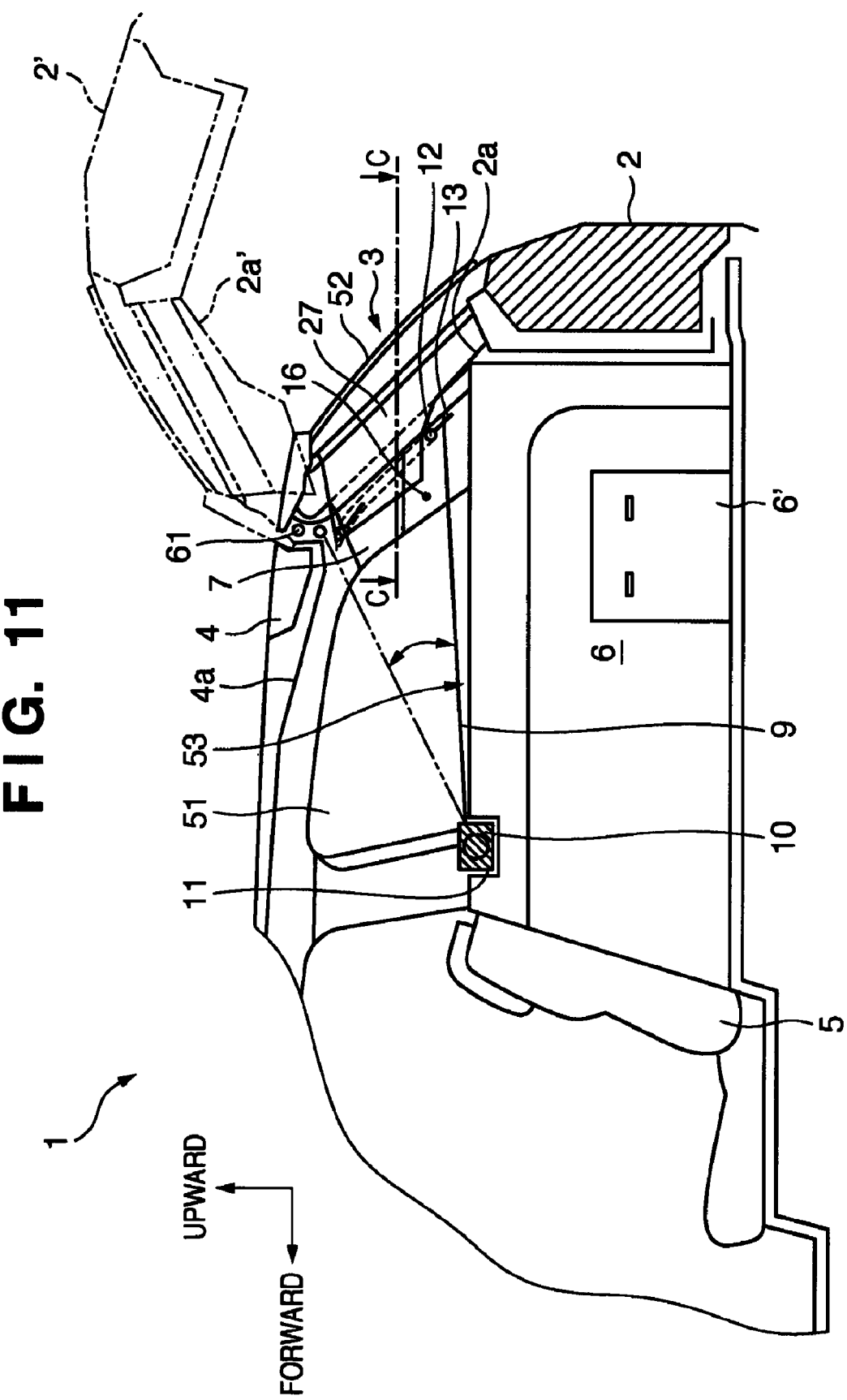
FIG. 11 is a perspective side view of an automobile rear portion according to a modification.
Figure 12:
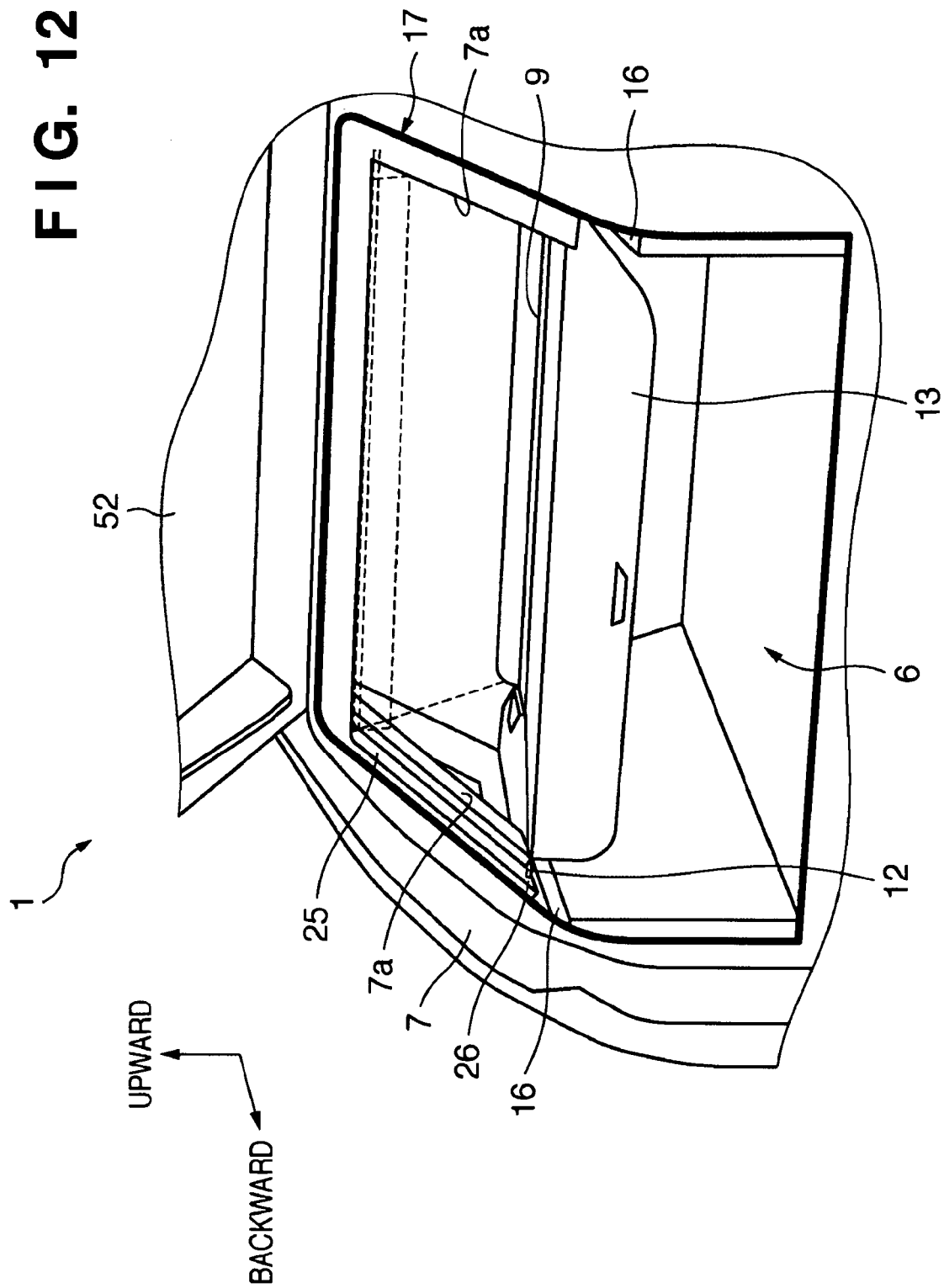
FIG. 12 is a perspective view of the main part of the automobile rear portion according to the modification.

The above embodiment in which the guide rails 14 are formed in the rear side of the vehicle is merely an example, and the present invention is not limited to this. FIGS. 11 to 13 show a modification which employs guide rail portions formed on the inner side of the automobile. FIG. 11 is a perspective side view of the rear portion of the automobile 1 according to the modification, FIG. 12 is a perspective view of the main part of the rear portion of the automobile 1, and FIG. 13 is a sectional view taken along the line C-C of FIG. 11.

According to this modification, in place of the guide rails 14 described above, guide rail portions 25 which guide the vertical movement of the cover distal end 13 are formed on the rear pillar trims 7a, respectively, as shown in FIGS. 12 and 13. The guide rail portions 25 are grooves formed on the inner side of the automobile, and the grooves have such widths that at least the rod 12 can enter it. In this case, each end of the rod 12 need not be bent in an L shape.

The lower ends of the guide rail portions 25 are open and communicate with the guide grooves 16. Pocket portions 26 are formed between the lower ends of the guide rail portions 25 and the guide grooves 16, respectively. The user can pull out the cover distal end 13 located on the take-up portion 10 side along the guide grooves 16 and insert the ends of the rod 12 in the pocket portions 26, thus locking the cover distal end 13.

The upper ends of the guide rail portions 25 are closed near the upper edge of the baggage compartment opening 3. When the user wishes to open the rear gate 2 and access the interior of the baggage compartment 6, he can hold the cover distal end 13, pull out the ends of the rod 12 from the pocket portions 26, and slide the cover distal end 13 along the guide rail portions 25 to their upper end positions. In this manner, the user can adjust the opening degree of the tonneau cover 9 easily in the same manner as in the above embodiment.

According to this modification, the rear gate trim 2a further has a projection 27. When the rear gate 2 is closed, the projection 27 projects forward of the vehicle along the upper edge of the baggage compartment opening 3 from the upper portions of the pocket portions 26. When the rear gate 2 is closed, the projection 27 covers the guide rail portion 25 laterally on the inner side of the automobile, as shown in FIG. 13. Therefore, when the rear gate 2 is closed, the guide rail portions 25 are not exposed, so that the appearance of the interior of the baggage compartment can improve. The upper and lower ends of the guide rail portions 25 are not covered, so they will not sandwich the tonneau cover 9 when the rear gate 2 is closed. The present invention can also naturally be applied to a folding tonneau board which includes a vertically extending guide portion on the rear surface of the baggage compartment opening.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-090915 filed Mar. 31, 2008, which is hereby incorporated by reference herein in its entirety.

What is claimed is:

1. A tonneau cover apparatus for an automobile including a baggage compartment, a baggage compartment opening, and a gate which covers the baggage compartment opening to be openable, the apparatus comprising:
a cover member extending from a position spaced apart from the baggage compartment opening toward the baggage compartment opening to cover the baggage compartment; and
a guide portion which is formed at a portion of the baggage compartment opening to be covered by the gate and guides vertical movement of a cover distal end of said cover member, said guide portion being covered with a weather strip formed at the baggage compartment opening to prevent dust and water from entering through a gap between the gate and the baggage compartment opening when the gate is closed.

2. The apparatus according to claim 1, wherein said guide portion is disposed on a surface of the baggage compartment opening on an automobile outer side which is covered by the gate.

3. The apparatus according to claim 2, further comprising a holding portion which holds the cover distal end at a predetermined position of said guide portion, said holding portion having a predetermined holding force in a direction along which the cover distal end is vertically moved along said guide portion.

4. The apparatus according to claim 3, wherein said guide portion has a shape that allows the cover distal end to move backward beyond a holdable range of said holding portion.

5. The apparatus according to claim 4, wherein said guide portion is disposed between a trim which covers the baggage compartment opening on an automobile inner side and an automobile body constituent member which forms the baggage compartment opening.

6. The apparatus according to claim 2, wherein said guide portion is disposed between a trim which covers the baggage compartment opening on an automobile inner side and an automobile body constituent member which forms the baggage compartment opening.

7. The apparatus according to claim 1, further comprising a take-up portion which is provided at a position spaced apart from the baggage compartment opening and takes up said cover member.

8. The apparatus according to claim 7, further comprising a second guide portion which is formed on a side surface of the baggage compartment and guides said cover member from a position where said take-up portion is disposed to a portion under said guide portion substantially horizontally.

9. The apparatus according to claim 8, further comprising a holding portion which holds the cover distal end at a predetermined position of said guide portion, said holding portion having a predetermined holding force in a direction along which the cover distal end is vertically moved along said guide portion.

10. The apparatus according to claim 9, wherein said guide portion has a shape that allows the cover distal end to move backward beyond a holdable range of said holding portion.

11. The apparatus according to claim 10, wherein said guide portion is disposed between a trim which covers the baggage compartment opening on an automobile inner side and an automobile body constituent member which forms the baggage compartment opening.

* * * * *

UNITED STATES PATENT AND TRADEMARK OFFICE
CERTIFICATE OF CORRECTION

PATENT NO.        : 7,857,372 B2
APPLICATION NO.   : 12/379781
DATED             : December 28, 2010
INVENTOR(S)       : Fukushima et al.

Page 1 of 1

It is certified that error appears in the above-identified patent and that said Letters Patent is hereby corrected as shown below:

Title Page, Item (73) Column 1 (Assignee), Line 1, delete "Madza" and insert --Mazda--, therefor.

Title Page, Column 2 (Other Publications), Line 1, delete "Eurpean" and insert --European--, therefor.

Signed and Sealed this
Twelfth Day of July, 2011

David J. Kappos
*Director of the United States Patent and Trademark Office*